United States Patent [19]
Creus

[11] 3,777,118
[45] Dec. 4, 1973

[54] BAKING OVEN
[76] Inventor: Juan Llordes Creus, Usandizaga 18, San Sebastian, Spain
[22] Filed: July 21, 1971
[21] Appl. No.: 164,768

[52] U.S. Cl. ................. 219/394, 107/62, 219/396, 219/478
[51] Int. Cl. ........................................... F27d 11/02
[58] Field of Search............107/55–65, 55 R, 55 C; 126/19, 261, 265; 219/385–394, 314, 219/390, 395, 396, 428, 475, 476, 478, 479

[56] References Cited
UNITED STATES PATENTS

| | | | |
|---|---|---|---|
| 1,553,357 | 9/1925 | Biebel | 219/394 |
| 2,196,035 | 4/1940 | Shaw | 219/386 X |
| 1,056,933 | 3/1913 | Perkins | 219/394 |
| 2,237,519 | 4/1941 | Bolling | 107/62 |
| 1,572,783 | 2/1926 | Fiske | 107/62 |
| 1,018,178 | 2/1912 | Faulds | 107/62 |
| 1,637,427 | 8/1927 | Riches et al. | 219/394 X |
| 1,534,087 | 4/1925 | Sellew et al. | 219/386 |
| 3,273,739 | 9/1966 | Wei | 126/265 X |

Primary Examiner—Volodymyr Y. Mayewsky
Attorney—E. F. Wenderoth et al.

[57] ABSTRACT

A baking oven having several baking chambers to which heat generating electric power is independently furnished. An insulating lower panel has supporting legs, and another, also insulating, upper panel completes the ensemble. Between these two panels there are a plurality of modules of the same or different heights, independent of each other, which when mounted constitute the baking chambers. Each module incorporates insulating layers on its sides approximately twice as thick as those on its upper and lower faces.

1 Claim, 2 Drawing Figures

BAKING OVEN

The invention relates to an improved baking oven, particularly for pastry and confectionery work.

The oven has a plurality of units, each of which is equipped with self-functioning components, such as controls to activate, controls for operating, etc.

Each of the units operates with electric power and on its lateral surface has layers of thermal insulation.

An object of the invention is to provide an oven whose size may be increased as required by production needs. It will only be necessary to acquire a new unit of the desired capacity to add to the existing ones.

A further object is to provide an oven formed by the superimposition or stacking of a number of units with basic coincident characteristics, excepting the height, which can vary from one to another, the heating component capacity naturally varying.

A further object of the invention is the provision of a simpler type of baking oven including only three components which are: a lower insulation panel, an upper one of analogous characteristics, and finally between them, a baking unit. Naturally, other similar ovens may be built by merely adding as many units as are desired since in any case, the group thereof will be contained between the upper and lower insulation panels.

A still further object of the invention is the provision of an oven having expanded working capacity merely by the acquisition of one or more baking units.

However, in ovens for the same purpose known to date, expanded production capacity necessarily presupposes acquisition of a complete new oven, since such known ovens are not modular; that is to say, they are constituted by a single body which in certain cases may have a number of divisions which originate independently functioning chambers, but are in no way separable, it therefore being impossible to expand a given oven.

A further object is to increase the production capacity of a bakery merely by adding a new module to the ensemble of those making up an existing oven.

With the above and other objects in view which will become apparent from the detailed description below, a preferred embodiment of the invention is shown in the drawings, in which.

The oven includes a lower panel 1 of a thermoinsulating nature, and a similar upper panel 3 which constitutes the upper part of the oven as a whole.

Between the insulating panels 1 and 3 as many modules 4 as desired may be placed.

Figure 1:
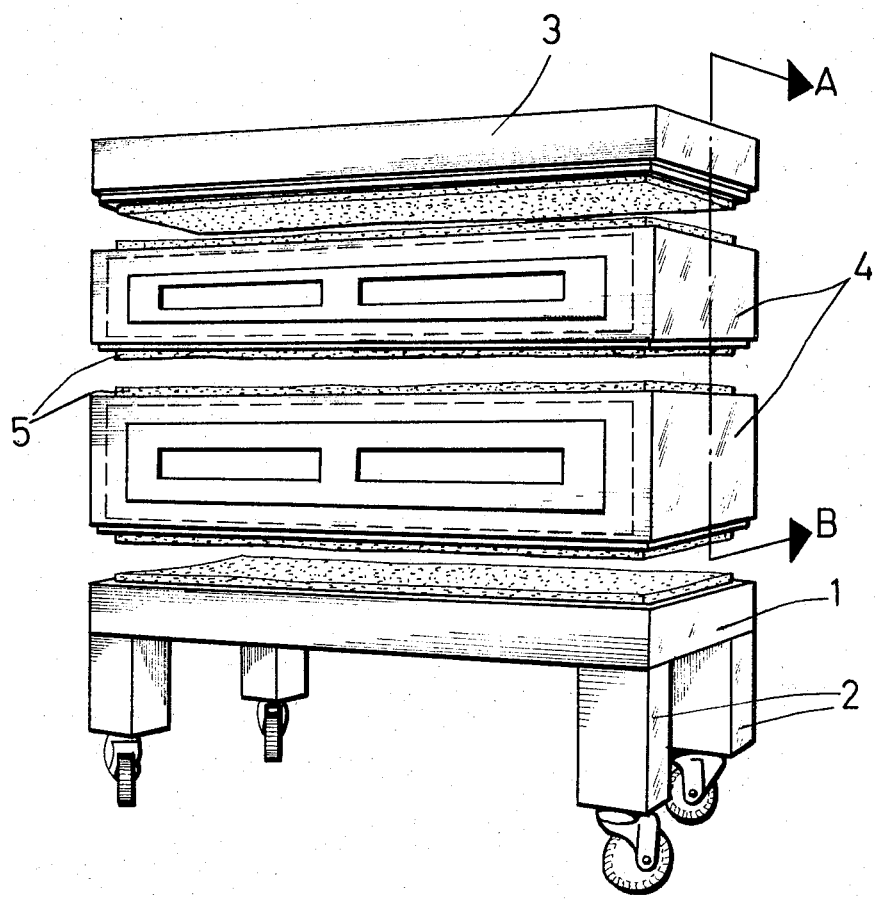
FIG. 1 is an exploded perspective view of the new oven.
Figure 2:
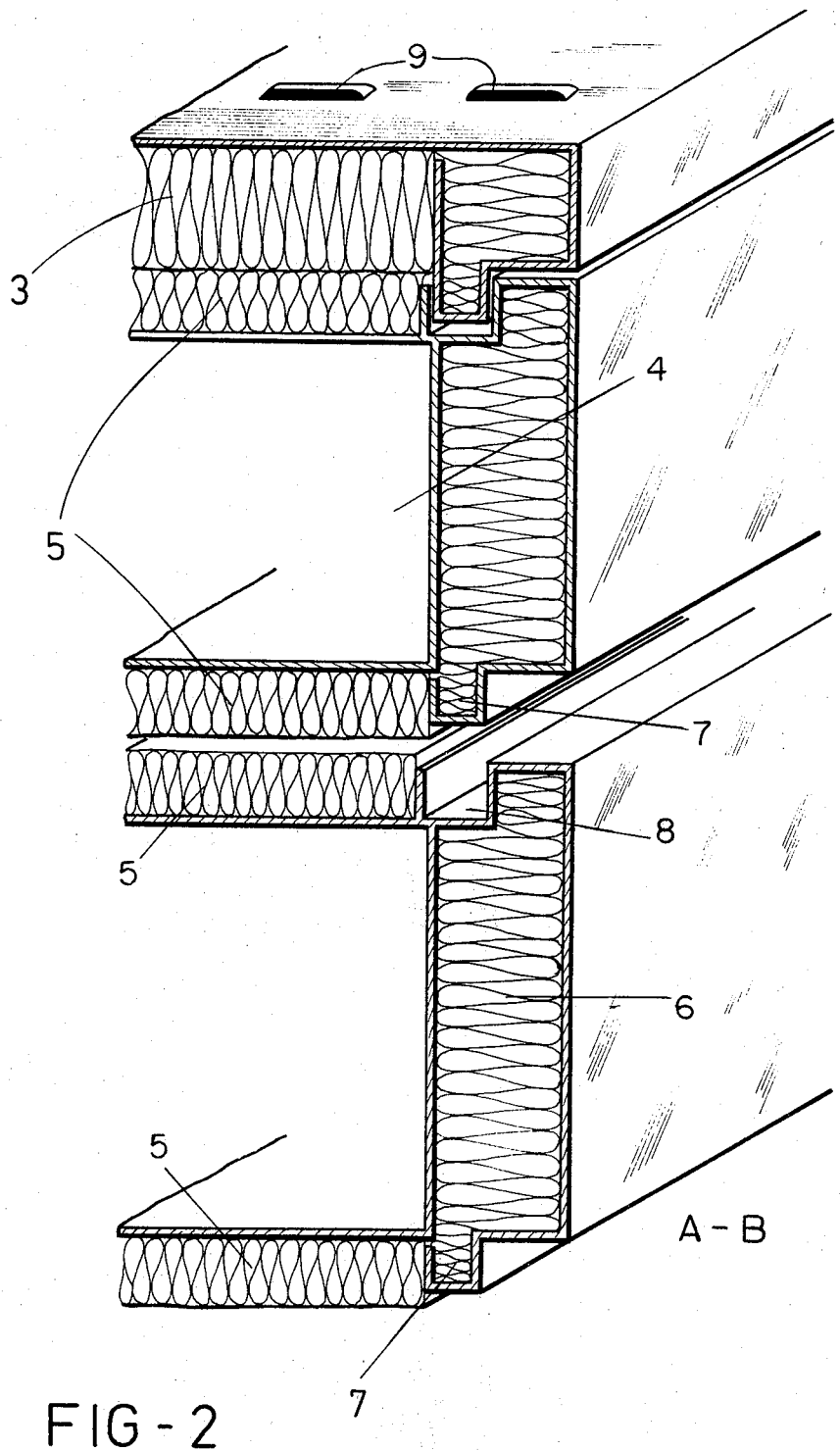
FIG. 2 is a sectional view according to section line A-B of FIG. 1.

On the upper and lower surfaces of each of the modules is a thin layer 5 of thermal insulation, while on the sides it has thermal insulation 6 of a thickness approximately twice that of the layers 5 on the upper and lower faces, as appears in FIG. 2.

The thin insulation layers 5 of each module, when placed one over the other, result in superimposition of the upper layer of one of them on the bottom of that which is on top, and these insulated layers being exposed, a double thickness will occur, thereby achieving perfect functioning of each of the baking chambers.

Each of the modules 4 has a peripheral flange 7 on its lower face, while the upper face has a peripheral channel 8, in such a way that when several of these modules are superimposed, the channels of the lower ones will receive the flanges of the upper ones.

Likewise, the lower insulating panel 1 has a channel 8 similar to that of the modules, so that the peripheral flange 7 of the lowest module will fit therein.

With respect to the upper insulating panel 3, its lower face has a flange 7 similar to that of the modules 4 so that upper panel fits perfectly on the uppermost of the stacked modules.

The matching flanges and channels 7 and 8 can be replaced by simple pivots and orifices which will likewise achieve insertion and fastening.

The lower panel may have legs 2 with wheels to facilitate moving of the oven ensemble.

As a functional detail looking to facilitate release of humidity which may occur when the oven is first used, the upper panel 3 will be equipped with a metal cover having a number of outlets 9 achieved, for example, by recessing or extrusion, through which said possible humidity is eliminated.

The most important advantages of this invention are as follows:

1. With only three elements: lower panel 1, upper panel 3 and two or three versions of modules 4 an unlimited variety of ovens may be achieved with which to achieve any type and height of oven. That is to say, ovens with two, three or more modules are produced to fulfill the needs of the customers. On the other hand, if the modules 4 differ insofar as height, a large variety of ovens may be achieved by interchanging them and varying their number.

2. Since the upper and lower insulators 5 of each module are in the open, when attached to each other they form a double insulation which is sufficient to achieve perfect functioning of the oven.

3. Ovens which are quite low in relation to those which would be necessary, are achieved with the same number of chambers by following the procedure of stacking a regular oven on top of another.

I claim:

1. A modular baking oven assembly comprising:
   a lower insulation panel having means on the bottom thereof for supporting said assembly;
   a plurality of oven modules each having an oven chamber therein stacked sequentially on the top of one another on said lower insulation panel, each of said oven modules having top, bottom and side insulation layers, said top and bottom insulation layers of each of said oven modules being exposed, each of said oven modules being independently operable, each of said heating chambers having electrical heating means therein;
   an upper insulation panel positioned on the top insulation layer of the uppermost of said oven modules;
   said exposed top and bottom insulation layers of each of said oven modules being approximately half the thickness of said side insulation layers thereof, said exposed top and bottom insulation of adjacent lower and upper oven modules being directly in contact, thereby forming a double insulation layer between said adjacent oven modules;
   said side panels of each of said oven modules having at the upper and lower ends thereof channels and flanges, thereby providing interlocking attachment means for adjacent oven modules.

* * * * *